United States Patent [19]

Jaggard

[11] E Re. 31,413

[45] Reissued Oct. 11, 1983

[54] GAS DEPOLARIZED ELECTROCHEMICAL CELLS AND METHOD OF ASSEMBLY

[75] Inventor: Arthur M. Jaggard, Chilicothe, Ohio

[73] Assignee: Gould Inc., Rolling Meadows, Ill.

[21] Appl. No.: 123,600

[22] Filed: Feb. 22, 1980

Related U.S. Patent Documents

Reissue of:

[64] Patent No.: 3,897,265
Issued: Jul. 29, 1975
Appl. No.: 437,924
Filed: Jan. 30, 1974

[51] Int. Cl.[3] ..... H01M 2/00

[52] U.S. Cl. ..... 429/27; 429/162; 429/164; 429/185; 29/623.2

[58] Field of Search ..... 429/27, 162, 171, 172, 429/174, 185, 247, 28; 29/623.1, 623.2

[56] References Cited

U.S. PATENT DOCUMENTS

| | | | |
|---|---|---|---|
| 2,712,565 | 7/1955 | Williams, Jr. | 136/107 |
| 2,859,266 | 11/1958 | Garvey et al. | 429/247 X |
| 2,937,222 | 5/1960 | Kempf | 29/623.2 |
| 2,942,054 | 6/1960 | Jeannen | 136/111 X |
| 2,971,999 | 2/1961 | Jacquier | 429/153 |
| 3,418,172 | 12/1968 | Fletcher | 29/623.1 |
| 3,746,580 | 7/1973 | Aker et al. | 429/27 |
| 3,762,956 | 10/1973 | Gillespie | 429/28 |

FOREIGN PATENT DOCUMENTS

| | | |
|---|---|---|
| 575246 | 5/1959 | Canada . |
| 2060600 | 6/1971 | France . |
| 1178859 | 1/1970 | United Kingdom . |
| 1319780 | 6/1973 | United Kingdom . |

*Primary Examiner*—Anthony Skapars
*Attorney, Agent, or Firm*—Leydig, Voit, Osann, Mayer & Holt, Ltd.

[57] ABSTRACT

A button type gas depolarized electrochemical cell that utilizes an air cathode which is sandwiched and sealed by an insulator and a pair of casings that interlock around the insulator to provide a leakproof cell. The invention also includes a process of assembling the cell to form a leakproof cell with a minimal number of parts by compressing the cell so as to cause plastic deformation and consequently a permanently stressed button cell.

58 Claims, 11 Drawing Figures

GAS DEPOLARIZED ELECTROCHEMICAL CELLS AND METHOD OF ASSEMBLY

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to electrochemical cells and, more particularly, to gas depolarized electrochemical cells usable as hearing aid batteries and the like which are commonly referred to as button cells because of their button-like appearance. The gas depolarized cells of the present invention have an increased capacity for the physical size of the cell as well as an improved electrolyte seal.

A further aspect of the invention is the process of assembling the cell through a sequence of steps including a sizing operation which produces a sealed cell having a minimum number of components.

2. Description of the Prior Art

The concept of gas depolarized galvanic cells is old in the art as evidenced by the numerous issued patents. The most pertinent patents are the metal air battery patents which contain a hydrophobic membrane on the outside of the air electrode. A new application for this type of metal air cell is in the small battery field. The art is replete with conventional small cells, however, to date, there have been few applications of metal air cells to the button cell field. An example of a zinc air button cell is shown in the Aker et al. U.S. Pat. No. 3,746,580. Aker shows a gas depolarized galvanic button cell which uses an air cathode and a zonc anode.

The present invention is an improvement over this newer type of zinc air button cell in which the prior art problem of sealing has been substantially eliminated. That is, with the metal-air button type such as shown in the Aker et al. patent, there are sealing problems. For example, Aker must injection mold a strip of plastic on the outer edge of his electrode assembly to obtain a seal. This has the disadvantage of decreasing the usable volume of the cell as well as increasing both the cost and the difficulty in assembling the cell. The present invention overcomes this problem by utilization of a single insulator which simultaneously seals the cell and insulates the positive terminal of the cell from the negative terminal of the cell.

A further aspect of the present invention is that assembly of the cell has been greatly simplified by the use of components which serve dual functions and a sizing process that simultaneously seals and forms the components of the cell into an integral assembled and operative cell.

A still further aspect of the present invention is that the cell has greater energy capacity than prior art zinc button cells of the same physical size because there is virtually no duplication of components.

SUMMARY OF THE INVENTION

Briefly, the invention comprises an improved electrochemical cell of the button type in which there is a minimum number of parts that perform dual functions to thereby increase the usable cell volume. The cell includes a member which functions both as an insulator and as an electrolyte seal between a pair of housing members which coact to form a leakproof cell and serve as external electrical contacts.

Another feature of the present invention is the novel process of assembling the cell to produce a sealed integral cell by utilization of a sizing die that simultaneously assembles and seals the cell into an integral unit.

DESCRIPTION OF THE PREFERRED EMBODIMENT

Figure 1:
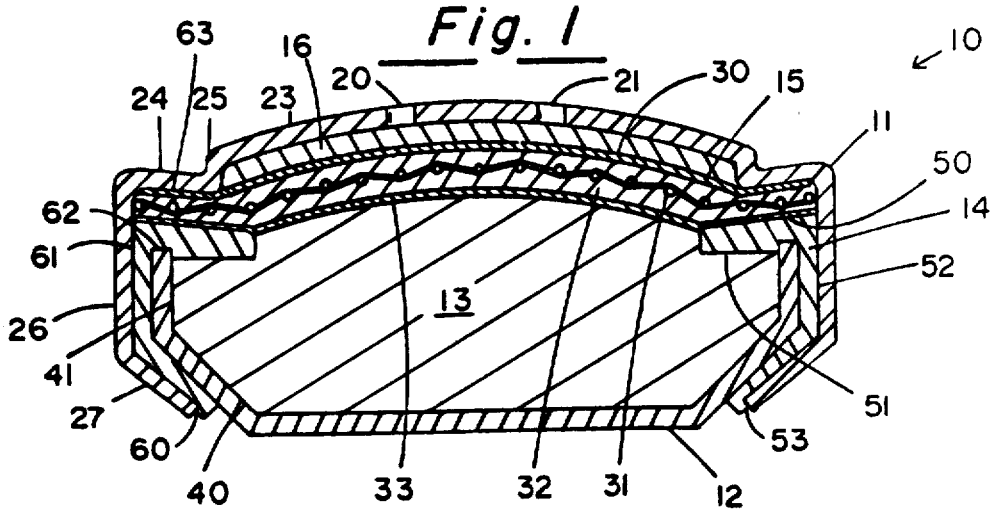
FIG. 1 is a cross sectional view of my meal air cell.

Referring to the drawings, reference numeral 10 generally designates my metal air cell containing a cathode casing or cup 11, an anode casing or cup 12, an anode material 13, an insulator 14 located between cathode cup 11 and anode cup 12 and the cathode assembly 15. In the preferred embodiment the active material 13 is amalgamated zinc, however, no limitation is intended thereto. The embodiment of FIG. 1 is also shown with one additional feature which is not necessary to the invention but has been added to the preferred embodiment as a safety feature. This added feature comprises a porous absorbent material such as a blotter 16 which is placed on the gas access side of the hydrophobic electrode assembly 15 to act as an absorber for any electrolyte which may leak from the cell under extreme environmental conditions.

Cathode housing or cup 11 is substantially circular in cross section and has an annular flat portion 24 which slants radially inward from vertical side 26 to meet a crown or convexo-concave portion 23. Crown portion 23 has openings 20 and 21 therein for allowing gas to diffuse into cathode assembly 15. It should be understood that while two openings are shown, more or fewer openings as well as the size of the openings can be varied within wide ranges as long as the cell obtains sufficient gas for operation.

The purpose of the crown 23 is to allow for crimping and sizing of cell 10. That is, during the sealing and sizing operation the cathode cup 11 is reduced in diameter by squeezing the cell containing the cathode cup through a die opening which has a smaller diameter than the outside diameter of the cathode cup. The squeezing or reduction of the outside diameter of the cathode cup causes the crown portion of the cathode cup to bulge further outward. If the top of the cathode housing cell 10 were flat instead of convexo-concave, the sizing operation would cause the top of cup 11 to dish inward. If the top dished inward, it would make it difficult to use the exterior of the cathode cup as an external electrical contact. Consequently, in the preferred embodiment, it is desirable to have a convexo-concave crown in the center of the cup which will maintain its convexo-concave shape during the sizing operation. However, other configurations than convexo-concave are operable as long as the top portion of the cathode will continually dish or deform in the same direction in all cells. It should be emphasized that the sealing and sizing operation is such that the cathode cup is reduced sufficiently in diameter so as to produce a permanent deformation of the cathode cup, i.e., by exceeding the yield strength of the housing material. In a typical example the outside diameter of the cathode cup before sizing is 0.460 inches and after sizing, the diameter is 0.453 inches. However, no limitation is intended thereto.

In FIG. 1, the bottom portion 27 of cathode housing 11 has been deformed radially inward to shapingly interlock with insulator 14 and anode housing 12. Because of the radial deformation of the cathode housing, insulator 14 is held in pressure engagement between cathode housing 11 and anode housing 12. Insulator 14 comprises an annular member which not only prevents electrical contact between cathode housing 11 and anode housing 12 but also forms an electrolyte seal. Insulator 14 has an angled annular top 50 which annularly abuts against cathode assembly 15 and an annular lip 51 which extends radially inwards beyond the edge of the anode cup 12.

Insulator 14 can be any nonconducting material, however, pliable polymer plastic materials such as high density polyethylene, polypropylene or nylon are preferred. It is desirable that the material used exhibit very little tendency to cold flow. As the seals in the present invention are obtained by squeezing the insulator between the cathode housing and the anode housing, it is apparent that the effectiveness of the seals may be impaired if the insulator should flow under pressure.

When cell 10 is assembled, sealed and sized as shown in FIG. 1, the lower portion 27 of cathode cup 11 is deformed or clinched radially inward to compress insulator 14 between lower portion 27 of cathode cup 11 and anode cup 12 to produce a tight pressure fit or pressure seal between insulator 14 and the respective housing surface in pressure contact therewith. Thus, a feature of the present invention is the use of coacting housing members to compress the insulating member therebetween to form a leakproof cell.

In addition, the annular edge 62 of anode housing 12 abuts or is in axial pressure contact with the underside of the insulator 14 to form an additional sealing area to prevent the leakage of electrolyte therearound. As can be seen from the drawing, edge 62 is actually embedded somewhat in insulator 14. Care must be taken so that the minimum width of edge 62 is not sufficiently small so as to sever insulator 14 during the sealing and sizing process nor sufficiently large so as to not form a good contact with insulator 14. Also, a seal is formed between the outside surface of anode housing 12 and the inside surface of insulator 14 which is held in pressure contact with the outside surface of anode housing 12 and by cathode housing 11. Similarly, an electrolyte seal is provided along the interface of insulator 14 and cathode housing member 11 by the pressure contact maintained between these two members.

The top portion 50 of insulator 14 is held in pressure contact against the underside of cathode assembly 15 and is designed so as to have approximately the same angle as the annular, flat portion 24 of cathode cup 11. The purpose of having the angles of these annular surfaces and the insulator and the cathode cup about the same is to prevent squeezing the cathode assembly from between insulator 14 and the cathode housing 11 during the assembly process. Thus, annular flat portion 24 of cathode cup 11 and top annular flat portion 50 of insulator 14 function as cathode-assembly contact areas.

In the present cell, four distinct major sealing areas are formed between the cathode housing and the anode housing with at least two of the major sealing areas being in series. For example, the electrolyte seal between edge 62 and the underside of insulator lip 51 is in series with the electrolyte seal between the inner surface of insulator 14 and the outside surface of anode cup 12. Similarly, the electrolyte seal between the inner surface of cathode housing 11 and the outer surface of insulator 14 is in series with the electrolyte seal formed around annular region 60 produced by partially embedding lip 27 into insulator 14.

Cathode assembly 15 comprises a current collecting member or screen 31, a cathode material 32, a hydrophobic member 30 and a separator 33. Cathode material 32 typically contains carbon black, a catalyst and a hydrophobic binder which is dispersed throughout the cathode.

On the outer surface of the cathode assembly 15 is a hydrophobic member 30 which typically may be a polymer such as porous polytetrafluoroethylene. However, other hydrophobic materials are also suitable for use with these types of metal air cells.

Cathode assembly 15 includes an electrical conductive collector screen 31 which forms a low resistance electrical contact with cathode cup 11. Typically, the cathode assembly is initially dimensioned so that the diameter is approximately the same as the inside diameter of the cathode cup 11 prior to sizing and larger than the inside diameter of the assembled cathode cup 11 after sizing. This facilitates the placing of the cathode assembly in cathode cup 11, yet provides a low resistance electrical contact between the edge of collecting screen 31 and the inside of cathode cup 11 by the reduction in diameter of the cathode cup 11 during the sizing process. That is, the sizing step not only seals cell 10 but it also insures that there is a low resistance electrical pressure contact formed between current collecting screen 31 and cathode cup 11 because of the radial pressure exerted by cathode cup 11 against the circumferential edge of current collector screen 31.

Located in anode cup 12 is anode material 13 which is kept from contact with cathode assembly 15 by a separator 33. The anode material is preferably made from zinc or amalgamated zinc powder. However, no limitation to the materials of the anode is intended thereto.

Figure 2:
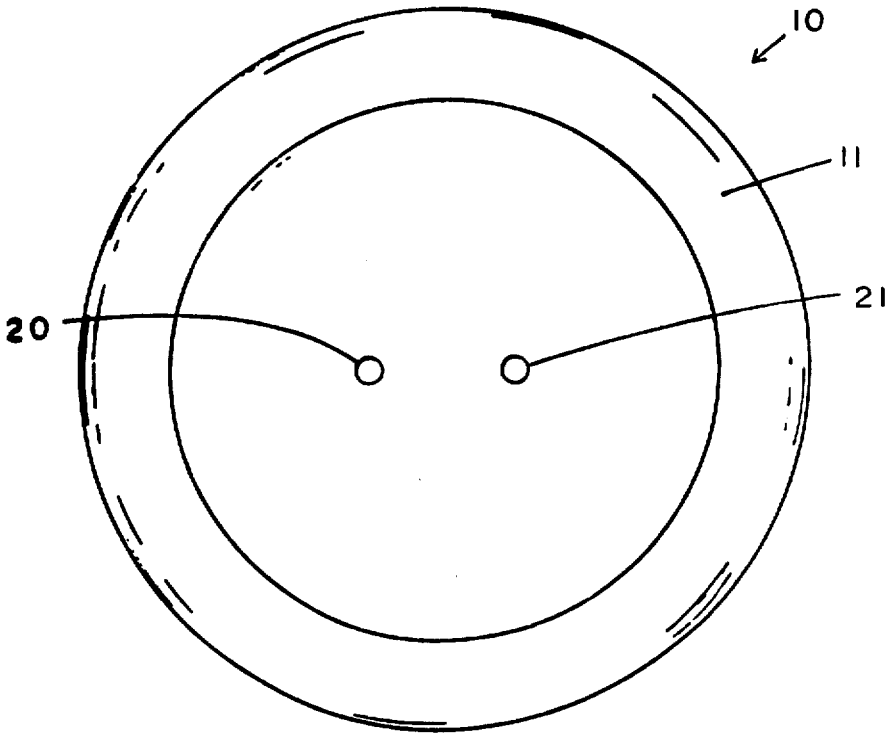
FIG. 2 is a top view of my cell.
Figure 3:
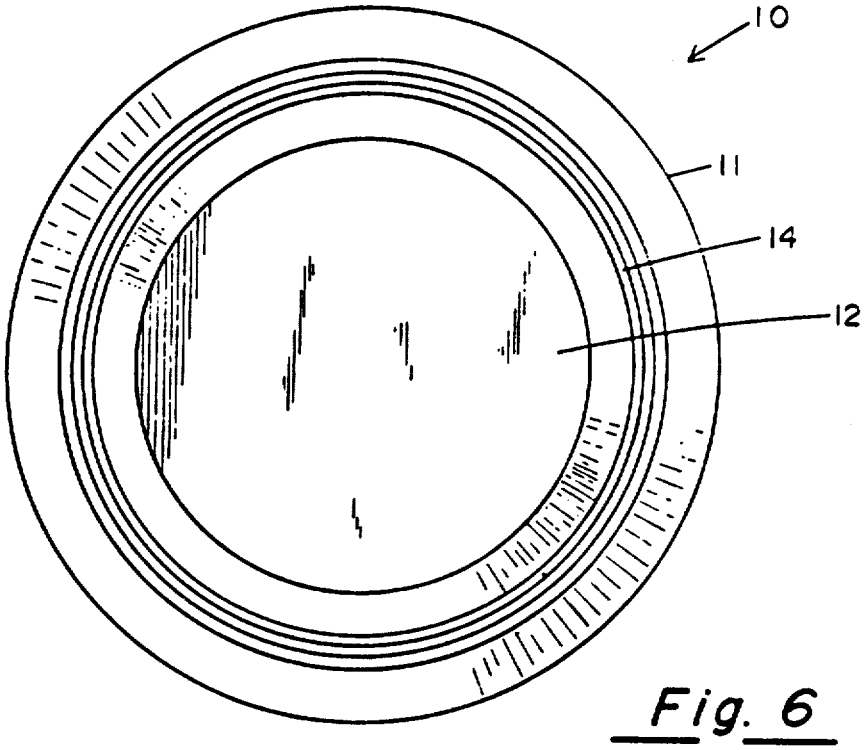
FIG. 3 is a bottom view of my cell.
Figure 4:
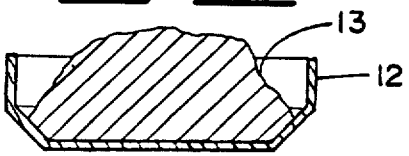
FIG. 4 is a sectional view of the partially assembled cell comprising the anode cup and anode material.

FIGS. 1, 2 and 3 show cell 10 in various views to illustrate the shape and appearances of the cell as well as the openings 20 and 21 therein for the passage of gas into the cell. In the preferred embodiment, a blotter 16 has been provided immediately inside the crown 23 of cathode 11. The blotter paper is added as a safety feature to absorb any electrolyte leakage in the cell that might occur under extreme environmental conditions. However, an additional effective electrolyte seal is provided by the cathode assembly being axially compressed between annular flat top portion 50 of insulator 14 and the lower surface 63 of cathode cup 11 during the sealing and sizing. This axial compression of the cathode assembly is maintained after the sealed and sized cell is released from the die, and under normal operating conditions, the electrolyte is inhibited from leaking out of the cell. In some prior art cells, the edge of cathode assembly 15 has an injection molded ring of plastic thereon to form a seal and prevent leakage of electrolyte past the cathode. However, the present invention eliminates the need for the aforementioned type of sealing and thus permits more efficient use of the internal volume of the cell.

Referring to FIGS. 4 through 9, the various steps involved in the assembly of my cell are illustrated. Briefly, the basic steps involved in assembling a cell are placing the anode material in the anode cup, placing the insulator on the anode cup, placing the cathode assembly in the cathode cup, placing the cathode cup with cathode assembly on the anode cup and insulator followed by compressing the cell in a sizing die.

In order to have the steps of the invention result in a sealed, operable cell, certain features have been added to insure the effectiveness of the sealing process. One of the features of the present invention is the forming of a crown 23 in cathode cup 11. Crown 23 performs a dual function as it forms an external contact for the cathode of the cell as well as to provide a controlled region of expansion during the assembly of the cell. That is, during the sealing and sizing of the cell as shown in FIG. 1 the outer diameter of cathode cup 11 is reduced by passing the assembled cell through a sizing die, however, the top portion of cathode cup 11 cannot be easily reduced and consequently, it must be allowed to deform. By placing a crown in cathode cup 11, the crown deforms or bends upward an additional amount to result in the arcuate shape shown in FIG. 1.

Figure 5:
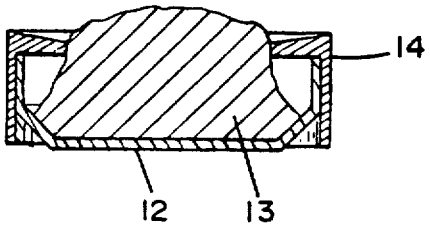
FIG. 5 is a sectional view of the partially assembled cell showing the insulator on the partially assembled cell components of FIG. 4.
Figure 6:
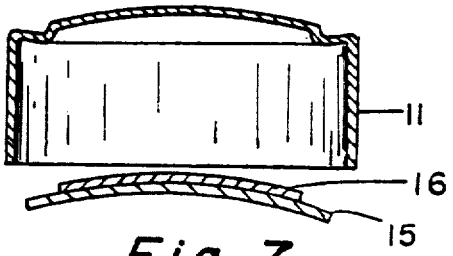
FIG. 6 is an exploded sectional view of the cathode assembly and the cathode cup.
Figure 7:
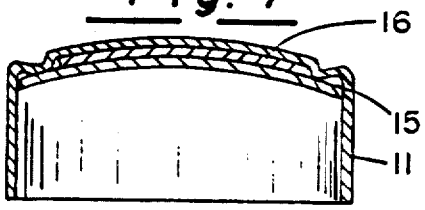
FIG. 7 is an assembled view of the cell components of FIG. 6.

After the anode material has been placed in anode cup 12, the insulator 14 is placed over the anode cup to produce an anode cup subassembly (FIG. 5). Similarly, cathode assembly 15 and blotter 16 are placed in alignment with cathode cup 11 (FIG. 6). In the next step, cathode assembly 15 and blotter 16 are placed in cathode cup 11 to produce a cathode cup subassembly (FIG. 7).

As previously described, the indicted dimension of the cathode assembly 15 is shown to be approximately the same as the inside diameter of the cathode cup prior to the sizing step so that the cathode assembly forms a slight interference fit with the cathode cup. However, it may also be of a slightly smaller diameter than the inside diameter of the cathode cup 11 prior to the sizing step. The particular dimension of the cathode assembly 15 is such that during the reduction in diameter of cathode cup 11, the cathode cup will establish electrical contact with the current collecting member 31 of cathode assembly 15.

Figure 8:
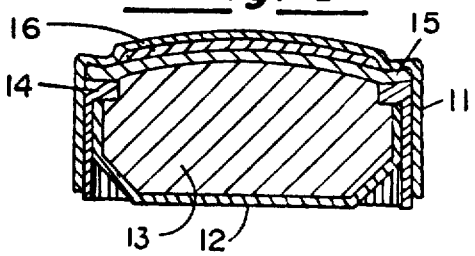
FIG. 8 is a sectional view of the assembled cell prior to sealing and sizing.

After the cathode cup subassembly and the anode cup subassembly have been completed, the cathode cup subassembly is placed on top of the anode cup subassembly (FIG. 8). With the cell in the assembled state, it can now be subjected to the final sealing sizing step.

During the sealing and sizing process, the cell is inserted in a sizing die 80 (FIGS. 9 and 9a) having conically tapered sides 81.

Located above die 80 is a power activated annular punch 82. Similarly, located below die 80 and projecting into die 80 is a power activated punch 90 having a collar 91 that abuts against the bottom of die 80. Punch 90 is held in the position shown in FIG. 9a by a suitable power mechanism (not shown) which applies a constant upward force $F_2$ against member 90. A flat surface 92 is provided on the top of punch 90 for placing the assembled cell thereon.

Figure 9:
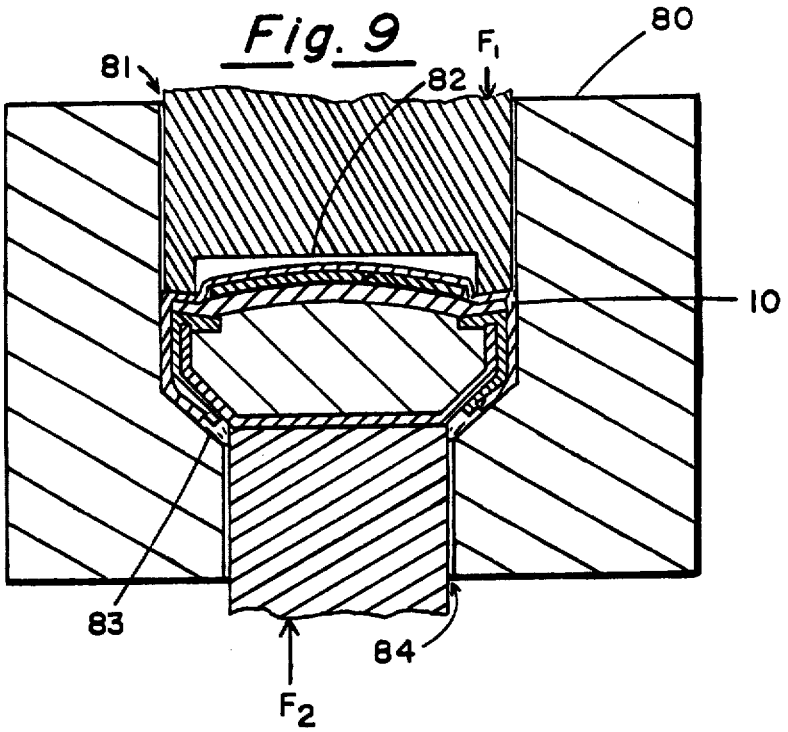
FIG. 9 shows a sizing die and the assembled cell during the sealing and sizing process.

In the sizing operation the assembled but unsized cell 10 is placed on surface 92. Next, annular punch 82 is brought in contact with the top of cell 10 and a downward force $F_1$ is applied to ring punch 82. Force $F_1$ is sufficiently large so as to overpower the upward force $F_2$ on member 90. The force $F_1$ on annular punch forces cell 10 downward into sizing die 80. As the diameter of punch 90 is less than the diameter of die 80 it passes freely through sizing die 80. However, the outside diameter of cell 10 is larger than the inside diameter of conically tapered section 81. Thus, the outer surface of cell 10 is deformed radially inward when cell 10 is forced downward in sizing die 80. When cell 10 reaches the bottom of die 80, the flange or skirt 27 of cell 10 is compressed or deformed inward to interlock the anode housing to the cathode housing. FIG. 9 shows cell 10 at the completion of the sizing operation. After the edges of skirt 27 are deformed or clenched, the force $F_1$ on annular punch 82 is removed to allow the force $F_2$ on member 90 to push cell 10 and annular punch 82 out of sizing die 80.

Figure 10:
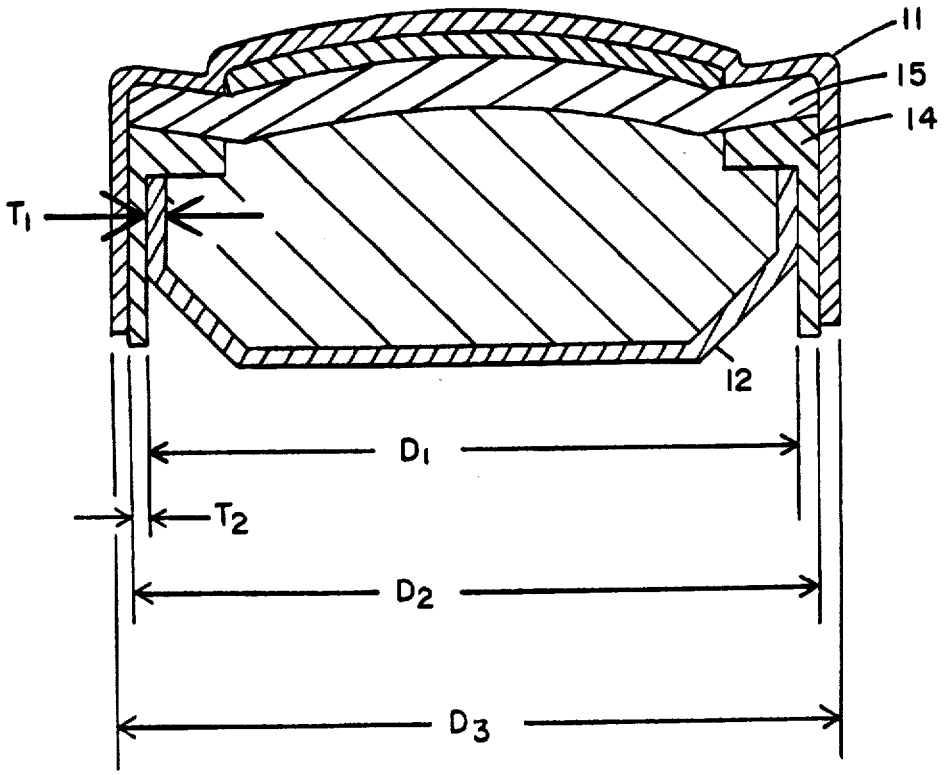
FIG. 10 shows an assembled cell prior to the sizing operation.

FIG. 10 shows a sectional view of an assembled cell prior to sealing and sizing. The outside diameter of the anode cup is denoted by $D_1$ and the outside diameter of the cathode cup is denoted by $D_3$ and the inside diameter of the cathode cup is denoted by $D_2$. The thickness of the insulator 14 is denoted by $T_2$ and the thickness of the anode cup 12 is denoted by $T_1$. A reference to the following example of typical dimensions of an assembled and unsized cell will reveal the inter-relationships of the various components.

EXAMPLE

A cathode cup having an outside diameter $D_3$ of 0.460 inch was formed of steel, the inside and outside of cathode cup was plated with nickel for corrosion resistance. The inside diameter $D_2$ of the cathode cup was 0.440 inches. The insulator had a thickness $T_2$ of about 0.010 inches. The anode cup had an outside diameter $D_1$ of 0.410 inches and was also formed from steel with a coating of tin on the inside for corrosion resistance. The thickness $T_1$ of the anode cup was about 0.010 inches.

Figure 9A:
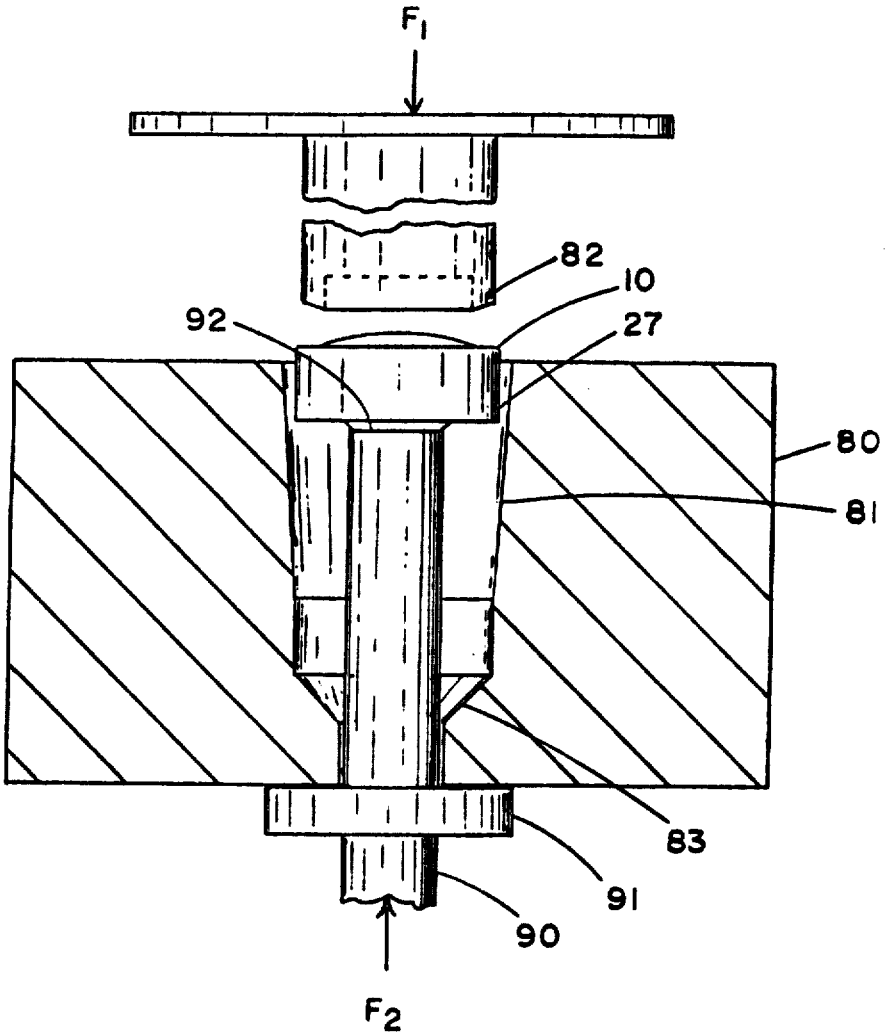
FIG. 9a shows a sizing die and the assembled cell prior to the sealing and sizing process.

The cell in its assembled but unsealed and unsized state was placed in the sizing die of FIGS. 9 and 9a and an axial force $F_1$ of about 10 to 25 pounds (preferably about 15 pounds) was applied to annular punch 82. After the cell was deformed in sizing die 80 the cell was removed. The outside diameter $D_3$ of the cell had been reduced from 0.460 inches to 0.453 inches or a 0.007 inch reduction in diameter. This reduction in diameter helped maintain the cathode cup in good electrical contact with the current collecting screen in cathode assembly 15 as well as shapingly interlocking cathode cup 11 against insulator 14 and anode cup 11 to form a leakproof electrolyte seal.

I claim:

1. A *sealed and sized* gas depolarized electrochemical cell comprising:

a first metal housing having a closed end and an open end, said closed end having an opening therein to allow gas to enter said first metal housing, said closed end of said first metal housing forming a first external electrical contact for said gas depolarized electrochemical cell, said first metal housing having means for fastening said first metal housing to a second metal housing:

a second metal housing having a closed end and an open end, said second metal housing having a region therein for receiving an anode material, said closed end of said second metal housing forming a second external electrical contact for said gas depolarized electrochemical cell; said second metal housing having means for fastening to said first metal housing;

a cathode assembly including an electrically conductive current collecting member, said current collecting member forming electrical contact with said first metal housing; a hydrophobic layer on one side of said cathode assembly and a separator on the opposite side of said cathode assembly;

a single insulating and sealing member having an L-shaped cross section shape, said insulating and sealing member having a first surface for forming sealing contact with said first metal housing, said insulating and sealing member having a second surface for forming sealing contact with said second metal housing; said insulating member having a third surface for abutting against and extending partially along said cathode assembly to thereby firmly hold said cathode assembly against said metal housing;

anode material located in said second metal housing to form electrical contact with said second metal housing, said anode material located adjacent said separator; and an electrolyte in said gas depolarized electrochemical cell so that said second metal housing, said first metal housing, and said insulating and sealing member coact to simultaneously seal and maintain said first metal housing and said second metal housing in a leakproof electrolyte seal; *said cell further characterized by a configuration in which said cathode assembly consists of an annular outer portion and a continuous arcuate convexo-concave center portion, said center portion having been dished or deformed in the same direction during sealing and sizing of said cell.*

2. The invention of claim 1 wherein said cell is circular in shape.

3. The invention of claim 1 wherein said second metal housing has a beveled bottom for mating with said first metal housing.

4. The invention of claim 1 wherein said first metal housing has a crown thereon.

5. The invention of claim 1 including a blotter located on said cathode assembly.

6. The invention of claim 1 wherein said one of said metal housings is partially embedded in said insulator to produce an electrolyte seal.

7. The invention of claim 1 wherein there are at least two electrolyte sealing areas in series.

8. The invention of claim 1 wherein said first metal housing is deformed radially inward on said second metal housing.

9. The invention of claim 1 wherein said insulator sealing member projects past the open end of said first metal housing.

10. The invention of claim 1 wherein the first metal housing is steel.

11. The invention of claim 1 wherein said insulating member and said cathode subassembly are in pressure contact against a portion of said first metal housing.

12. A *sealed and sized* gas depolarized electrochemical button cell comprising five main components including:

an anode cup having a surface for shapingly engaging a cathode cup and for holding anode material and forming an external anode contact;

anode material located in said anode cup;

a cathode cup *containing a gas inlet passage and* having a surface for shapingly engaging said anode cup and for holding a cathode assembly and forming an external cathode contact;

a cathode assembly located in said cathode cup; and a single insulator and sealing member having an L-shaped cross section shape held in compression between said surface of said anode cup and said surface of said cathode cup to thereby produce a leakproof electrochemical button cell; *and said cell is further characterized by a configuration in which said cathode assembly consists of an annular outer portion and a continuous arcuate convexo-concave center portion, said center portion having been dished or deformed in the same direction during the sealing and sizing of said cell.*

13. The invention of claim 12 wherein said insulating member, said anode cup and said cathode cup coact to produce electrolyte sealing regions.

14. The invention of claim 13 wherein there are at least two electrolyte sealing regions in series between said anode cup and said insulating sealing member.

15. The invention of claim 14 wherein there are at least two electrolyte sealing regions in series between said cathode cup and said insulating sealing member.

16. The invention of claim 15 wherein said anode cup has a beveled corner for mating with said cathode cup.

17. The invention of claim 16 wherein said cathode cup has a crown portion.

18. The invention of claim 17 wherein said crown contains a gas inlet passage.

19. The invention of claim 18 including a blotter located adjacent said cathode assembly.

20. The method of assemblying a *sealed and sized* gas depolarized electrochemical cell comprising the steps of:

forming a first electrode cup having means for engaging a second electrode cup;

forming a second electrode cup having a top edge and means for engaging said first electrode cup and nestable in said first electrode cup;

inserting [an electrode] *a cathode* assembly in one of said first electrode cup and said second electrode cup;

placing anode material in one of said first electrode cup and second electrode cup;

placing an insulating and sealing member having an L-shaped cross section shape on said second electrode cup so a portion of said insulating and sealing member engages said top edge of said second electrode cup; and nesting said second electrode cup and said insulating and sealing member in said first electrode cup followed by deforming said first electrode cup and said insulating and sealing member until said first electrode cup and said insulating and sealing member shapingly engage said means on said second electrode cup with said insulating and sealing member therebetween; *and wherein said cell is further characterized by a configuration in which said cathode assembly consists of an annular outer portion and a continuous arcuate convexo-concave center portion, said center portion having been dished or deformed in the same direction during said deforming of said first electrode cup.*

21. The process of claim 20 including the step of radially deforming said first electrode cup until a permanent deformation of said first electrode cup occurs.

22. The process of claim 21 including the step of forming a crown in at least one of said first electrode cup [on] *and* said second electrode cup.

23. The process of claim 22 including the step of bending said means on said first electrode cup until said means on said first electrode cup holds said insulating and sealing member in pressure engagement against said means on said second electrode cup.

24. The process of claim 23 including the step of axially and radially compressing said first electrode cup on said second electrode cup.

*25. A sealed and sized gas depolarized electrochemical cell comprising:*

*a first metal housing having a closed end and an open end, said closed end having an opening therein to allow gas to enter said first metal housing, said closed end of said first metal housing forming a first external electrical contact for said gas depolarized electrochemical cell, said first metal housing having means for fastening said first metal housing to a second metal housing;*

*a second metal housing having a closed end and an open end, said second metal housing having a region therein for receiving an anode material, said closed end of said second metal housing forming a second external electrical contact for said gas depolarized electrochemical cell; said second metal housing having means for fastening to said first metal housing;*

*a cathode assembly including an electrically conductive current collecting member, said current collecting member forming electrical contact with said first metal housing; a hydrophobic layer on one side of said cathode assembly and a separator on the opposite side of said cathode assembly;*

*a single insulating and sealing member having an L-shaped cross section shape, said insulating and sealing member having a first surface for forming sealing contact with said first metal housing, said insulating and sealing member having a second surface for forming sealing contact with said second metal housing; said insulating member having a third surface for abutting against and extending partially along said cathode assembly to thereby firmly hold said cathode assembly against said metal housing; anode material located in said second metal housing to form electrical contact with said second metal housing, said anode material located adjacent said separator; and an electrolyte in said gas depolarized electrochemical cell so that said second metal housing, said first metal housing, and said insulating and sealing member coact to simultaneously seal and maintain said first metal housing and said second metal housing in a leakproof electrolyte seal; and said first metal housing is further characterized by the closed end thereof consisting of an annular flat outer portion and a continuous, arcuate convexo-concave crown center portion with the concave side of said crown center portion facing in the direction of said cathode assembly.*

*26. The invention of claim 25 wherein said second metal housing has a beveled bottom for mating with said first metal housing.*

*27. The invention of claim 25 including a blotter located on said cathode assembly.*

*28. The invention of claim 25 wherein said first metal housing is deformed radially inward on said second metal housing.*

*29. The invention of claim 25 wherein said insulator sealing member projects past the open end of said first metal housing.*

*30. A sealed and sized gas depolarized electrochemical cell comprising five main components including:*

*an anode cup having a surface for shapingly engaging a cathode cup and for holding anode material and forming an external anode contact;*

*anode material located in said anode cup;*

*a cathode cup having a closed end and an open end, containing a gas inlet passage and having a surface for shapingly engaging said anode cup and for holding a cathode assembly and forming an external cathode contact;*

*a cathode assembly located in said cathode cup; and*

*a single insulator and sealing member having an L-shaped cross section shape held in compression between said surface of said anode cup and said surface of said cathode cup to thereby produce a leakproof electrochemical button cell; and*

*said cathode cup is further characterized by the closed end thereof consisting of an annular outer portion and a continuous, arcuate convexo-concave crown center portion with the concave side of said crown center portion facing in the direction of said cathode assembly.*

*31. The invention of claim 30 wherein said anode cup has a beveled corner for mating with said cathode cup.*

*32. The invention of claim 31 including a blotter located adjacent said cathode assembly.*

*33. The method of assemblying a sealed and sized gas depolarized electrochemical cell comprising the steps of*

*forming a first electrode cup having a closed end and an open end and having means for engaging a second electrode cup;*

*forming a second electrode cup having a top edge and means for engaging said first electrode cup and nestable in said first electrode cup;*

*inserting a cathode assembly in one of said first electrode cup and said second electrode cup;*

*placing anode material in one of said first electrode cup and second electrode cup;*

*placing an insulating and sealing member having an L-shaped cross section shape on said second electrode cup so a portion of said insulating and sealing member engages said top edge of said second electrode cup; and*

*nesting said second electrode cup and said insulating and sealing member in said first electrode cup followed by deforming said first electrode cup and said insulating and sealing member until said first electrode cup and said insulating and sealing member shapingly engage said means on said second electrode cup with said insulating and sealing member therebetween; and*

*wherein said first electrode cup is further characterized by the closed end thereof consisting of an annular outer portion and a continuous, arcuate convexo-concave crown center portion with the concave side of said*

*crown center portion facing in the direction of said cathode assembly.*

*34. The process of claim 33 including the step of radially deforming said first electrode cup until a permanent deformation of said first electrode cup occurs.*

*35. A sealed and sized gas depolarized electrochemical cell comprising:*

*a first metal housing having a closed end and an open end, said closed end having an opening therein to allow gas to enter said first metal housing, said closed end of said first metal housing forming a first external electrical contact for said gas depolarized electrochemical cell, said first metal housing having means for fastening said first metal housing to a second metal housing;*

*a second metal housing having a closed end and an open end, said second metal housing having a region therein for receiving an anode material, said closed end of said second metal housing forming a second external electrical contact for said gas depolarized electrochemical cell; said second metal housing having means for fastening to said first metal housing;*

*a cathode assembly including an electrically conductive current collecting member, said current collecting member forming electrical contact with said first metal housing; a hydrophobic layer on one side of said cathode assembly and a separator on the opposite side of said cathode assembly;*

*a single insulating and sealing member having an L-shaped cross section shape, said insulating and sealing member having a first surface for forming sealing contact with said first metal housing, said insulating and sealing member having a second surface for forming sealing contact with said second metal housing; said insulating member having a third surface for abutting against and extending partially along said cathode assembly to thereby firmly hold said cathode assembly against said metal housing;*

*anode material located in said second metal housing to form electrical contact with said second metal housing, said anode material located adjacent said separator; and an electrolyte in said gas depolarized electrochemical cell so that said second metal housing, said first metal housing, and said insulating and sealing member coact to simultaneously seal and maintain said first metal housing and said second metal housing in a leakproof electrolyte seal; and*

*said cathode assembly is further characterized by consisting of an annular outer portion and a continuous, arcuate convexo-concave center portion with the concave side of said center portion facing in the direction of said anode material.*

*36. The invention of claim 35 wherein said second metal housing has a beveled bottom for mating with said first metal housing.*

*37. The invention of claim 35 wherein said first metal housing has a crown thereon.*

*38. The invention of claim 35 including a blotter located on said cathode assembly.*

*39. The invention of claim 35 wherein said first metal housing is deformed radially inward on said second metal housing.*

*40. The invention of claim 35 wherein said insulator sealing member projects past the open end of said first metal housing.*

*41. A sealed and sized gas depolarized electrochemical button cell comprising five main components including:*

*an anode cup having a surface for shapingly engaging a cathode cup and for holding anode material and forming an external anode contact;*

*anode material located in said anode cup;*

*a cathode cup containing a gas inlet passage and having a surface for shapingly engaging said anode cup and for holding a cathode assembly and forming an external cathode contact;*

*a cathode assembly located in said cathode cup; and*

*a single insulator and sealing member having an L-shaped cross section shape held in compression between said surface of said anode cup and said surface of said cathode cup to thereby produce a leakproof electrochemical button cell; and*

*said cathode assembly is further characterized by consisting of an annular outer portion and a continuous, arcuate convexo-concave center portion with the concave side of said center portion facing in the direction of said anode material.*

*42. The invention of claim 41 wherein said anode cup has a beveled corner for mating with said cathode cup.*

*43. The invention of claim 42 wherein said cathode cup has a crown portion.*

*44. The invention of claim 43 including a blotter located adjacent said cathode assembly.*

*45. The method of assembling a sealed and sized gas depolarized electrochemical cell comprising the steps of forming a first electrode cup having means for engaging a second electrode cup;*

*forming a second electrode cup having a top edge and means for engaging said first electrode cup and nestable in said first electrode cup;*

*inserting a cathode assembly in one of said first electrode cup and said second electrode cup;*

*placing anode material in one of said first electrode cup and second electrode cup;*

*placing an insulating and sealing member having an L-shaped cross section shape on said second electrode cup so a portion of said insulating and sealing member engages said top edge of said second electrode cup;*

*placing an insulating and sealing member having an L-shaped cross section shape on said second electrode cup so a portion of said insulating and sealing member engages said top edge of said second electrode cup;*

*nesting said second electrode cup and said insulating and sealing member in said first electrode cup followed by deforming said first electrode cup and said insulating and sealing member until said first electrode cup and said insulating and sealing member shapingly engage said means on said second electrode cup with said insulating and sealing member therebetween; and*

*said cathode assembly is further characterized by consisting of an annular outer portion and a continuous, arcuate convexo-concave center portion with the concave side of said center portion facing in the direction of said anode material.*

*46. The process of claim 45 including the step of radially deforming said first electrode cup until a permanent deformation of said first electrode cup occurs.*

*47. A sealed and sized gas depolarized electrochemical cell comprising:*

*a first metal housing having a closed end and an open end, said closed end having an opening therein to allow gas to enter said first metal housing, said closed end of said first metal housing forming a first external electrical contact for said gas depolarized electrochemical cell, said first metal housing having means*

*for fastening said first metal housing to a second metal housing;*

*a second metal housing having a closed end and an open end, said second metal housing having a region therein for receiving an anode material, said closed end of said second metal housing forming a second external electrical contact for said gas depolarized electrochemical cell; said second metal housing having means for fastening to said first metal housing;*

*a cathode assembly including an electrically conductive current collecting member, said current collecting member forming electrical contact with said first metal housing; a hydrophobic layer on one side of said cathode assembly and a separator on the opposite side of said cathode assembly;*

*a single insulating and sealing member having an L-shaped cross section shape, said insulating and sealing member having a first surface for forming sealing contact with said first metal housing, said insulating and sealing member having a second surface for forming sealing contact with said second metal housing; said insulating member having a third surface for abutting against and extending partially along said cathode assembly to thereby firmly hold said cathode assembly against said metal housing;*

*anode material located in said second metal housing to form electrical contact with said second metal housing, said anode material located adjacent said separator; and an electrolyte in said gas depolarized electrochemical cell so that said second metal housing, said first metal housing, and said insulating and sealing member coact to simultaneously seal and maintain said first metal housing and said second metal housing in a leakproof electrolyte seal; and said closed end of said first metal housing is further characterized by consisting of an annular outer portion and a continuous, arcuate convexo-concave center portion, said center portion having been dished or deformed in the same direction during the sealing and sizing of said cell.*

*48. The invention of claim 47 wherein said second metal housing has a beveled bottom for mating with said first metal housing.*

*49. The invention of claim 47 wherein said first metal housing has a crown thereon.*

*50. The invention of claim 47 including a blotter located on said cathode assembly.*

*51. The invention of claim 47 wherein said first metal housing is deformed radially inward on said second metal housing.*

*52. The invention of claim 47 wherein said insulator sealing member projects past the open end of said first metal housing.*

*53. A sealed and sized gas depolarized electrochemical button cell comprising five main components including:*

*an anode cup having a surface for shapingly engaging a cathode cup and for holding anode material and forming an external anode contact;*

*anode material located in said anode cup;*

*a cathode cup having a closed end and an open end, containing a gas inlet passage in said closed end and having a surface for shapingly engaging said anode cup and for holding a cathode assembly and forming an external cathode contact;*

*a cathode assembly located in said cathode cup; and*

*a single insulator and sealing member having an L-shaped cross section shape held in compression between said surface of said anode cup and said surface of said cathode cup to thereby produce a leakproof electrochemical button cell; and*

*said cathode cup is further characterized by the closed end thereof consisting of an annular outer portion and a continuous, arcuate convexo-concave center portion, said center portion having been dished or deformed in the same direction during the sealing and sizing of said cell.*

*54. The invention of claim 53 wherein said anode cup has a beveled corner for mating with said cathode cup.*

*55. The invention of claim 54 wherein said cathode cup has a crown portion.*

*56. The invention of claim 55 including a blotter located adjacent said cathode assembly.*

*57. The method of assemblying a sealed and sized gas depolarized electrochemical cell comprising the steps of forming a first electrode cup having an open end and a closed end and having means for engaging a second electrode cup;*

*forming a second electrode cup having a top edge and means for engaging said first electrode cup and nestable in said first electrode cup;*

*inserting a cathode assembly in one of said first electrode cup and said second electrode cup;*

*placing anode material in one of said first electrode cup and second electrode cup;*

*placing an insulating and sealing member having an L-shaped cross section shape on said second electrode cup so a portion of said insulating and sealing member engages said top edge of said second electrode cup;*

*nesting said second electrode cup and said insulating and sealing member in said first electrode cup followed by deforming said first electrode cup and said insulating and sealing member until said first electrode cup and said insulating and sealing member shapingly engage said means on said second electrode cup with said insulating and sealing member therebetween; and*

*said closed end of said first electrode cup is further characterized by consisting of an outer annular portion and a continuous, arcuate convexo-concave center portion, said center portion having been dished or deformed in the same direction during the sealing and sizing of said cell.*

*58. The process of claim 57 including the step of radially deforming said first electrode cup until a permanent deformation of said first electrode cup occurs.*

* * * * *

UNITED STATES PATENT AND TRADEMARK OFFICE

CERTIFICATE OF CORRECTION

PATENT NO. : Re. 31,413

DATED : October 11, 1983

INVENTOR(S) : Arthur M. Jaggard

It is certified that error appears in the above-identified patent and that said Letters Patent is hereby corrected as shown below:

In Claim 1, at Column 7, line 45, following "sizing of said cell", insert --; said annular outer portion of said cathode assembly extending radially inward to meet and join said center portion and further characterized by the upper surface thereof being flat and engaging a correspondingly flat lower annular surface of said first metal housing --.

In Claim 12, at Column 8, line 26, following "and sizing of said cell", insert --; said annular outer portion of said cathode assembly extending radially inward to meet and join said center portion and further characterized by the upper surface thereof being flat and engaging a correspondingly flat lower annular surface of said cathode cup--.

In Claim 20, at Column 9, line 4, following "convexo-concave center portion", insert --; said annular outer portion of said cathode assembly extending radially inward to meet and join said center portion and further characterized by the upper surface thereof being flat and engaging a correspondingly flat lower annular surface of said first electrode cup--.

In Claim 25, at Column 9, line 44, following "said cathode assembly;", insert --said cathode assembly consisting of an annular outer portion and a continuous, arcuate convexo-concave center portion having been dished or deformed in the same direction during sealing and sizing of said cell;--.

In Claim 25, at Column 9, line 65, following "an annular", delete --flat--.

UNITED STATES PATENT AND TRADEMARK OFFICE

CERTIFICATE OF CORRECTION

PATENT NO. : Re. 31,413

DATED : October 11, 1983

INVENTOR(S) : Arthur M. Jaggard

It is certified that error appears in the above-identified patent and that said Letters Patent is hereby corrected as shown below:

In Claim 25, at Column 9, line 68, following "direction of said cathode assembly", insert --; said annular outer portion of said cathode assembly and said first metal housing extending radially inward to meet and join its said center portion and further characterized by the upper surface of said cathode assembly being flat and engaging a correspondingly flat lower annular surface of said first metal housing--.

In Claim 45, at Column 12, lines 41 - 44, delete --placing an insulating and sealing member having an L-shaped cross section shape on said second electrode cup so a portion of said insulating and sealing member engages said top edge of said second electrode cup;--.

Signed and Sealed this

Fourth Day of September 1984

[SEAL]

Attest:

GERALD J. MOSSINGHOFF

Attesting Officer

Commissioner of Patents and Trademarks